United States Patent

Tsukakoshi et al.

[11] Patent Number: 5,926,623
[45] Date of Patent: Jul. 20, 1999

[54] METHOD FOR TRANSMITTING DATA FROM A FIRST PROCESSING UNIT HAVING A RELATIVELY LARGE MEMORY CAPACITY TO A SECOND PROCESSING UNIT HAVING A RELATIVELY SMALL MEMORY CAPACITY

[75] Inventors: Nobuyuki Tsukakoshi, Yokohama; Takashi Oshiyama, Fujisawa, both of Japan

[73] Assignee: International Business Machines Corporation, Armonk, N.Y.

[21] Appl. No.: 08/778,317

[22] Filed: Jan. 2, 1997

[30] Foreign Application Priority Data

Jan. 29, 1996 [JP] Japan .................................. 8-012790

[51] Int. Cl.⁶ .............................. G06F 3/00; G06F 15/62
[52] U.S. Cl. ................................ 395/200.3; 395/200.32; 395/200.49; 395/200.58; 395/200.62; 707/1; 707/104
[58] Field of Search ........................... 395/200.3, 200.61, 395/200.62, 200.47, 200.58, 200.32; 364/231.1, 231.2, 231.3, 231.31, 243.1; 707/1, 104

[56] References Cited

U.S. PATENT DOCUMENTS 4,534,012  8/1985  Yokozawa ................................ 368/327
5,377,326  12/1994 Murata et al. ............................ 395/200
5,392,390  2/1995  Crozier ..................................... 395/161

FOREIGN PATENT DOCUMENTS

0317481  5/1989  European Pat. Off. ......... G06F 15/16
9306553  4/1993  WIPO .............................. G06F 13/28
9412938  6/1994  WIPO .............................. G06F 15/02

*Primary Examiner*—Dung C. Dinh
*Assistant Examiner*—Q.-K. Le
*Attorney, Agent, or Firm*—Anthony N. Magistrale; Daniel E. McConnell

[57] ABSTRACT

A data transmission method for transmitting data from a first processing unit having a relatively large memory capacity to a second processing unit having a relatively small memory capacity. The method has steps of (a) retrieving data stored in a first memory device, (b) storing in a temporary file only a record, from the retrieved data, relating to a predetermined time period including a current date; (c) determining whether or not the size of the temporary file is within the capacity of a second, smaller capacity, memory device; and (d) transferring the temporary file to the second processing unit in response to an affirmative result of the step (c), or not transferring the temporary file to the second processing unit in response to a negative result of the step (c).

2 Claims, 10 Drawing Sheets

FIG.1

LOTUS_ORGANIZER

FILE (F) EDIT (E) VIEW (V) CREATE (C) SECTION (S) PHONE (P) APPOINTMENT (A) HELP (H)

| TO DO | ADDRESS | CALLS | PLANNER | NOTEPAD | ANNIV. |

1996    HEISEI 8    JANUARY

| JANUARY | | | | | JANUARY |
|---------|---------|-----------|----------|--------|----------------|
| MONDAY | TUESDAY | WEDNESDAY | THURSDAY | FRIDAY | SATURDAY-SUNDAY |
| 1 | 2 | 3 | 4 | 5 | 6 |
| NEW YEAR'S DAY | | | HOLIDAY | HOLIDAY | 7 |
| 8 | 9 | 10 | 11 | 12 | 13 |
| WEEKLY PLAN TABLE | WEEKLY ACTIVITY REPORT | | | WEEKLY ACTIVITY REPORT 10:30 PREVIOUS ARRANGEMENT 14:00 VACCINATION | 14 |
| 09:30 '96 NEW Y | 12:45 LINE MEETING | | | | |
| 15 | 16 | 17 | 18 | 19 | 20 |
| ADULT'S DAY WEEKLY PLAN TABLE | 12:45 LINE MEET | POSTNATAL EXAMINATION | | WEEKLY ACTIVITY REPORT | 21 13:00 MEMORIAL SERVICE |
| 22 | 23 | 24 | 25 | 26 | 27 |
| WEEKLY PLAN TABLE | 12:45 LINE MEET | 09:45 TECHNICAL TRAINING | 09:45 TECHNICAL TRAINING | WEEKLY ACTIVITY REPORT 09:45 TECHNICAL TRAINING | 28 |
| 29 | 30 | 31 | 1 | 2 | 3 |
| WEEKLY PLAN TABLE | 12:45 LINE MEET | HOLIDAY 08:50 18-MONTH POSTNATAL EXAMINATION | | WEEKLY ACTIVITY REPORT OCR & JOB RECORD | 4 |
| JANUARY | | | | | 11 MONTHS LEFT |

CALENDAR     JAN 9

DETAILED SETUP OF FILE

FILE :
A:Y96DIAR.CSV

TITLE

96DIAR.CSV

DATA TYPE

DIARY/CALENDAR ▼

PIM APPLICATION NAME

LOTUS ORGANIZER R2J ▼

☐ PERIOD NOT SPECIFIED   ☒ 1 MONTH FROM TODAY

FROM                                TO
YYYY/  MM/  DD            YYYY/  MM/  DD
1996   01   09            1996   02   08

OK        CANCEL

| CONFIDENTIAL | CATE-GORIES | STARTDATETIME | ENDDATETIME | DESCRIPTION | COST CODE | CUSTOMER CODE | PENCILED IN |
|---|---|---|---|---|---|---|---|
| 0 | | 1996/1/9 12:45 | 1996/1/9 14:45 | LINE MEETING | | | 0 |
| 0 | | 1996/1/16 12:45 | 1996/1/16 14:45 | LINE MEETING | | | 0 |
| 0 | | 1996/1/23 12:45 | 1996/1/23 14:45 | LINE MEETING | | | 0 |
| 0 | | 1996/1/30 12:45 | 1996/1/30 14:45 | LINE MEETING | | | 0 |
| 0 | | 1996/2/6 13:00 | 1996/2/6 15:00 | LINE MEETING | | | 0 |
| 0 | | 1996/2/13 13:00 | 1996/2/13 15:00 | LINE MEETING | | | 0 |
| 0 | | 1996/2/20 13:00 | 1996/2/20 15:00 | LINE MEETING | | | 0 |
| 0 | | 1996/2/27 13:00 | 1996/2/27 15:00 | LINE MEETING | | | 0 |
| 0 | | 1996/3/5 13:15 | 1996/3/5 15:15 | LINE MEETING | | | 0 |
| 0 | | 1996/3/12 13:15 | 1996/3/12 15:15 | LINE MEETING | | | 0 |
| 0 | | 1996/3/19 13:15 | 1996/3/19 15:15 | LINE MEETING | | | 0 |
| 0 | | 1996/3/26 13:15 | 1996/3/26 15:15 | LINE MEETING | | | 0 |
| 0 | | 1996/1/17 9:30 | 1996/1/17 10:30 | POST-VACCINATION HEALTH CARE ROOM | | | 0 |
| 0 | | 1996/1/21 13:00 | 1996/1/21 16:00 | MEMORIAL SERVICE | | | 0 |
| 0 | | 1996/1/31 8:50 | 1996/1/31 9:30 | 18-MONTH POSTNATAL EXAMINATION | | | 0 |
| 0 | | 1996/1/12 14:00 | 1996/1/12 14:30 | VACCINATION | | | 0 |
| 0 | | 1996/1/12 10:30 | 1996/1/12 11:30 | PREVIOUS ARRANGEMENT | | | 0 |
| 0 | | 1996/1/8 9:30 | 1996/1/8 10:15 | '96 NEW YEAR KICK OFF MEETING (PRESIDENT'S SPEECH; OPENING FOR 15 MINUTES) | | | 0 |
| 0 | | 1996/1/24 9:45 | 1996/1/24 17:30 | TECHNICAL TRAINING | | | 0 |
| 0 | | 1996/1/25 9:45 | 1996/1/25 17:30 | TECHNICAL TRAINING | | | 0 |
| 0 | | 1996/1/26 9:45 | 1996/1/26 17:30 | TECHNICAL TRAINING | | | 0 |

FIG.10

| CONFIDENTIAL | CATE-GORIES | STARTDATE | DUEDATE | DESCRIPTION | CUSTOMER CODE | PRIORITY | COMPLETIONDATE | STATUS |
|---|---|---|---|---|---|---|---|---|
| 0 | | 1996/1/4 0:00 | 1996/1/4 0:00 | OCR & JOB RECORD LIST | | NIL | 1995/12/25 0:00 | COMPLETED |
| 0 | | 1996/2/2 0:00 | 1996/2/2 0:00 | OCR & JOB RECORD LIST | | NIL | 0000-00-00 00:00:00 | SCHEDULED |
| 0 | | 1996/3/4 0:00 | 1996/3/4 0:00 | OCR & JOB RECORD LIST | | NIL | 0000-00-00 00:00:00 | SCHEDULED |
| 0 | | 1996/4/3 0:00 | 1996/4/3 0:00 | OCR & JOB RECORD LIST | | NIL | 0000-00-00 00:00:00 | SCHEDULED |
| 0 | | 1996/5/6 0:00 | 1996/5/6 0:00 | OCR & JOB RECORD LIST | | NIL | 0000-00-00 00:00:00 | SCHEDULED |
| 0 | | 1996/6/3 0:00 | 1996/6/3 0:00 | OCR & JOB RECORD LIST | | NIL | 0000-00-00 00:00:00 | SCHEDULED |
| 0 | | 1996/1/8 0:00 | 1996/1/8 0:00 | JOB RECORD LIST | | PRIORITY 3 | 1996/1/8 0:00 | COMPLETED |
| 0 | | 1996/1/15 0:00 | 1996/1/15 0:00 | JOB RECORD LIST | | PRIORITY 3 | 0000-00-00 00:00:00 | SCHEDULED |
| 0 | | 1996/1/22 0:00 | 1996/1/22 0:00 | JOB RECORD LIST | | PRIORITY 3 | 0000-00-00 00:00:00 | SCHEDULED |
| 0 | | 1996/6/3 0:00 | 1996/6/3 0:00 | JOB RECORD LIST | | PRIORITY 3 | 0000-00-00 00:00:00 | SCHEDULED |
| 0 | | 1996/6/10 0:00 | 1996/6/10 0:00 | JOB RECORD LIST | | PRIORITY 3 | 0000-00-00 00:00:00 | SCHEDULED |
| 0 | | 1996/6/17 0:00 | 1996/6/17 0:00 | JOB RECORD LIST | | PRIORITY 3 | 0000-00-00 00:00:00 | SCHEDULED |
| 0 | | 1996/6/24 0:00 | 1996/6/24 0:00 | JOB RECORD LIST | | PRIORITY 3 | 0000-00-00 00:00:00 | SCHEDULED |
| 0 | | 1996/1/5 0:00 | 1996/1/5 0:00 | JOB RECORD LIST | | PRIORITY 1 | 0000-00-00 00:00:00 | EXPIRED |
| 0 | | 1996/1/12 0:00 | 1996/1/12 0:00 | JOB RECORD LIST | | PRIORITY 1 | 0000-00-00 00:00:00 | SCHEDULED |
| 0 | | 1996/1/19 0:00 | 1996/1/19 0:00 | JOB RECORD LIST | | PRIORITY 1 | 0000-00-00 00:00:00 | SCHEDULED |
| 0 | | 1996/1/26 0:00 | 1996/1/26 0:00 | JOB RECORD LIST | | PRIORITY 1 | 0000-00-00 00:00:00 | SCHEDULED |
| 0 | | 1996/2/2 0:00 | 1996/2/2 0:00 | JOB RECORD LIST | | PRIORITY 1 | 0000-00-00 00:00:00 | SCHEDULED |
| 0 | | 1996/2/9 0:00 | 1996/2/9 0:00 | JOB RECORD LIST | | PRIORITY 1 | 0000-00-00 00:00:00 | SCHEDULED |
| 0 | | 1996/2/16 0:00 | 1996/2/16 0:00 | JOB RECORD LIST | | PRIORITY 1 | 0000-00-00 00:00:00 | SCHEDULED |
| 0 | | 1996/2/23 0:00 | 1996/2/23 0:00 | JOB RECORD LIST | | PRIORITY 1 | 0000-00-00 00:00:00 | SCHEDULED |
| 0 | | 1996/3/1 0:00 | 1996/3/1 0:00 | JOB RECORD LIST | | PRIORITY 1 | 0000-00-00 00:00:00 | SCHEDULED |

FIG.11

METHOD FOR TRANSMITTING DATA FROM A FIRST PROCESSING UNIT HAVING A RELATIVELY LARGE MEMORY CAPACITY TO A SECOND PROCESSING UNIT HAVING A RELATIVELY SMALL MEMORY CAPACITY

BACKGROUND OF THE INVENTION

The present invention relates to a method for transferring data between two devices, and in particular, to a method for transmitting data from a first processing unit having a relatively large memory capacity to a second processing unit having a relatively small memory capacity. More specifically, the present invention pertains to a method for transmitting data from a first processing unit having a relatively large memory capacity to a second processing unit having a relatively small memory capacity, while the difference between the memory capacities of the two processing units is taken into consideration.

In accordance with recent technical progress, various personal computers (hereafter referred to as "PCs"), such as desktop and notebook types, have been developed and are available on the market.

As is well known, these PCs can be employed for many applications by executing application programs. Word processing software for editing documents and database software for calculation are very popular examples of such application programs. The forms of application programs vary, however, and lately programs have appeared that support user management of personal information: schedulers, telephone books/address books, and note pads. A so-called PIM (Personal Information Manager) is personal information management software that provides for the total management of personal data. With a PIM, a user can enter into a scheduler the name of a company for which a person that the user has contacted works, and when the name of that company is changed and the user enters the new name in an address book, an interactive function automatically changes the company name entry for the scheduler. "Lotus Organizer" is an example of such PIM software.

Figure 7:
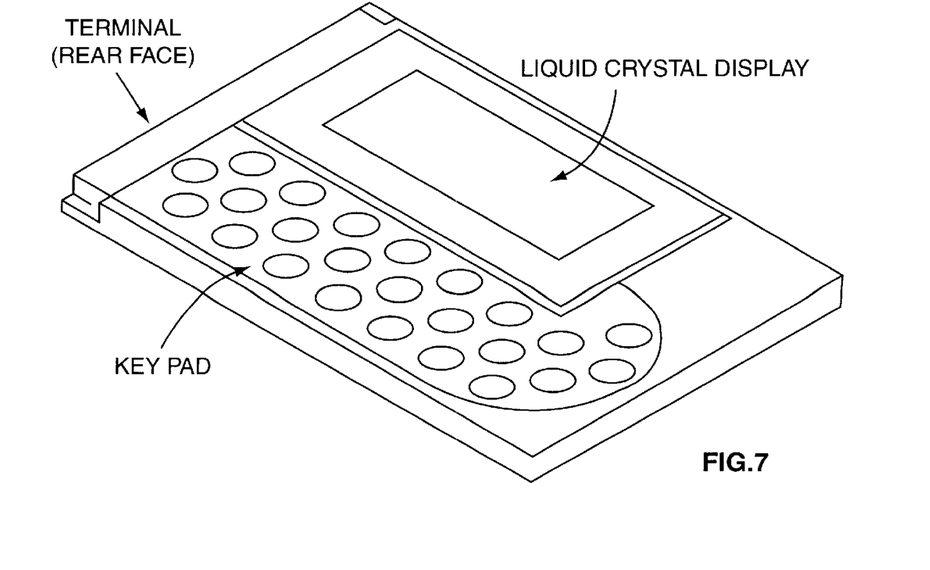
FIG. 7 is a diagram showing an outline of a PC card "ChipCard" sold by IBM Japan, Co., Ltd..

PC hardware comes in a variety of shapes. There is, for example, a PC card, the "ChipCard" (see FIG. 7), which is sold by IBM Japan, Co., Ltd., that conforms to the standard specifications established by PCMCIA/JEIDA. (PCMCIA/JEIDA: PCMCIA is an abbreviation of "Personal Computer Memory Card International Association", and JEIDA is an abbreviation of "Japan Electronic Industry Development Association". The PCMCIA and JEIDA work together for standardization of PC cards.) An important feature of this PC card, the design of which is based on the PC architecture and which incorporates a CPU, is that it can be used independently (stand-alone), while when it is inserted into a card slot of a PC (host machine) it serves as a memory card. A host machine into which a ChipCard is inserted can download to the ChipCard personal information (e.g., a calendar, schedule management data, time, a telephone book, and business card management data) that has been edited by the PIM software on the host machine, and can refer to and edit data that have accumulated on the ChipCard. When the ChipCard is removed from the card slot and is in the stand-alone state, however, its incorporated CPU functions independently, and the ChipCard can be used as an electronic notebook in which personal information that has been obtained by downloading can be referred to. Accordingly, data stored in the ChipCard can also be updated by employing a user interface provided for the ChipCard, i.e., a liquid crystal display panel and key pads.

The ChipCard, in other words, can function both as a memory card and as an electronic notebook, and was produced to enable data managed by a common PC (hereinafter referred to as a "host machine") to be also used in a mobile environment. A user can create a database on a host machine having a full-sized keyboard and a large screen display, and can temporarily save the created database on, for example, a hard disk in the host machine. The data can thereafter be transmitted to a ChipCard inserted into a PC card slot by using a download utility program. Therefore, so long as a user carries the ChipCard, he or she can refer to the data that are created by the PC, or can partially change that data, even in a mobile environment.

Although the main feature of a ChipCard is its compact and light "PC", this feature is accompanied by various trade-off problems.

One of the trade-offs is that its memory capacity is limited. A desktop PC or a notebook PC, for example, can easily acquire a memory capacity of several hundred MB or several GB by mounting a hard disk. On the other hand, because of size and weight limitations, available memory means for a ChipCard is limited to a memory chip, such as SRAM, which has only a small capacity (several hundred KB). In other words, the difference between the memory capacities of a host machine and a ChipCard can be great.

Since there is no limitation on the memory capacity of a host machine, a user can create a huge database by using database software. For example, a schedule management database (e.g., a diary or a To Do list) for several months, or spanning a period longer than a year, can be edited by using a PIM, such as Lotus Organizer, and the resultant data can be accumulated on the HDD. While, a ChipCard, which has only a small capacity, can spare only 100 KB for one application (e.g., schedule management software, such as a "data viewer"). If a data transmission utility program in a host machine does not take into consideration the difference in the memory capacities of the two devices, and transfers a huge amount of data to the card as it is, this may have unexpected consequences, such as the overwriting and destruction of other data existing in the memory device.

SUMMARY OF THE INVENTION

To resolve these shortcomings, it is one purpose of the present invention to provide an excellent data transmission method for transferring data between two devices.

It is another purpose of the present invention to provide an excellent data transmission method for transmitting data from a first processing unit having a relatively large memory capacity to a second processing unit having a relatively small memory capacity.

It is an additional purpose of the present invention to provide an excellent data transmission method for transmitting data from a first processing unit having a relatively large memory capacity to a second processing unit having a relatively small memory capacity, while the difference in the memory capacities of the two processing units will be taken into consideration.

BRIEF DESCRIPTION OF THE DRAWINGS

Some of the purposes of the invention having been stated, others will appear as the description proceeds, when taken in connection with the accompanying drawings, in which:

FIG. 11 is a Table, referred to hereinafter as Table 2, illustrating the result of re-editing certain data files.

DESCRIPTION OF THE PREFERRED EMBODIMENT(s)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the above purposes, according to a first aspect of the present invention, a method is provided for transmitting data from a first processing unit having a relatively large memory capacity to a second processing unit having a relatively small memory capacity, comprising the steps of: selecting, in accordance with attribute information included in data to be transferred, data in a quantity that is suitable for the memory capacity of the second processing unit; and transferring the selected data to the second processing unit.

According to a second aspect of the present invention, a method is provided for transmitting data, the data including date information, from a first processing unit having a relatively large memory capacity to a second processing unit having a relatively small memory capacity, comprising the step of selectively transferring, among data specified to be transferred, only a record relating to predetermined time period that includes a current date.

According to a third aspect of the present invention, a method is provided for transmitting data from a first processing unit having a first memory device with a relatively large memory capacity to a second processing unit having a second memory device with a relatively small memory capacity, comprising the steps of: (a) retrieving data stored in the first memory device, each record in the data including date information; (b) storing in a temporary file only a record, from the retrieved data, relating to a predetermined time period including a current date; (c) determining whether or not the size of the temporary file is within the capacity of the second memory device; and (d) transferring the temporary file to the second processing unit in response to an affirmative result of the step (c), or not transferring the temporary file to the second processing unit in response to a negative result of the step (c).

According to a fourth aspect of the present invention, a method is provided for transmitting data from a first processing unit having a relatively large memory capacity to a second processing unit having a relatively small memory capacity, comprising the step of selectively transferring a record, among data specified to be transferred, that matches a predetermined condition.

According to the present invention, based upon attribute information included in data specified to be transmitted, only data in a quantity that is suitable for the memory capacity of the second processing unit are selected and transferred to the second processing unit. Or, for the transfer of data including date information, instead of all available data, only a record for a predetermined period that has a current beginning date is transferred to the second processing unit. For example, for a file related to a diary or to a To Do list, when a date is so limited that it falls within a predetermined period (e.g., within a one month period that begins on the current date at the time of data transfer), the size of the data to be transferred can be selected from within a certain range. Furthermore, when data selected for transmission exceed a permissible capacity for the second memory device, data transfer is not performed. In other words, an enormous amount of data that the second processing unit could not possibly receive will never be transferred, and there is therefore no need to worry about the risk that transferred data may overwrite other memory areas in the second memory device and that existing data will be destroyed.

In one embodiment of the present invention which will be described later, the first processing unit corresponds to a personal computer (PC); the first memory device corresponds to a hard disk device incorporated in the PC; the second processing unit corresponds to a PC card (e.g., "ChipCard" produced by IBM Japan, Co., Ltd.) that incorporates a CPU and can independently execute application programs; and the second memory device corresponds to an SRAM chip incorporated in the PC card. Data transferred between the two processing units may be a diary or a To Do list that are edited by PIM software, such as Lotus Organizer.

A preferred embodiment of the present invention will now be described while referring to the drawings.

Figure 1:
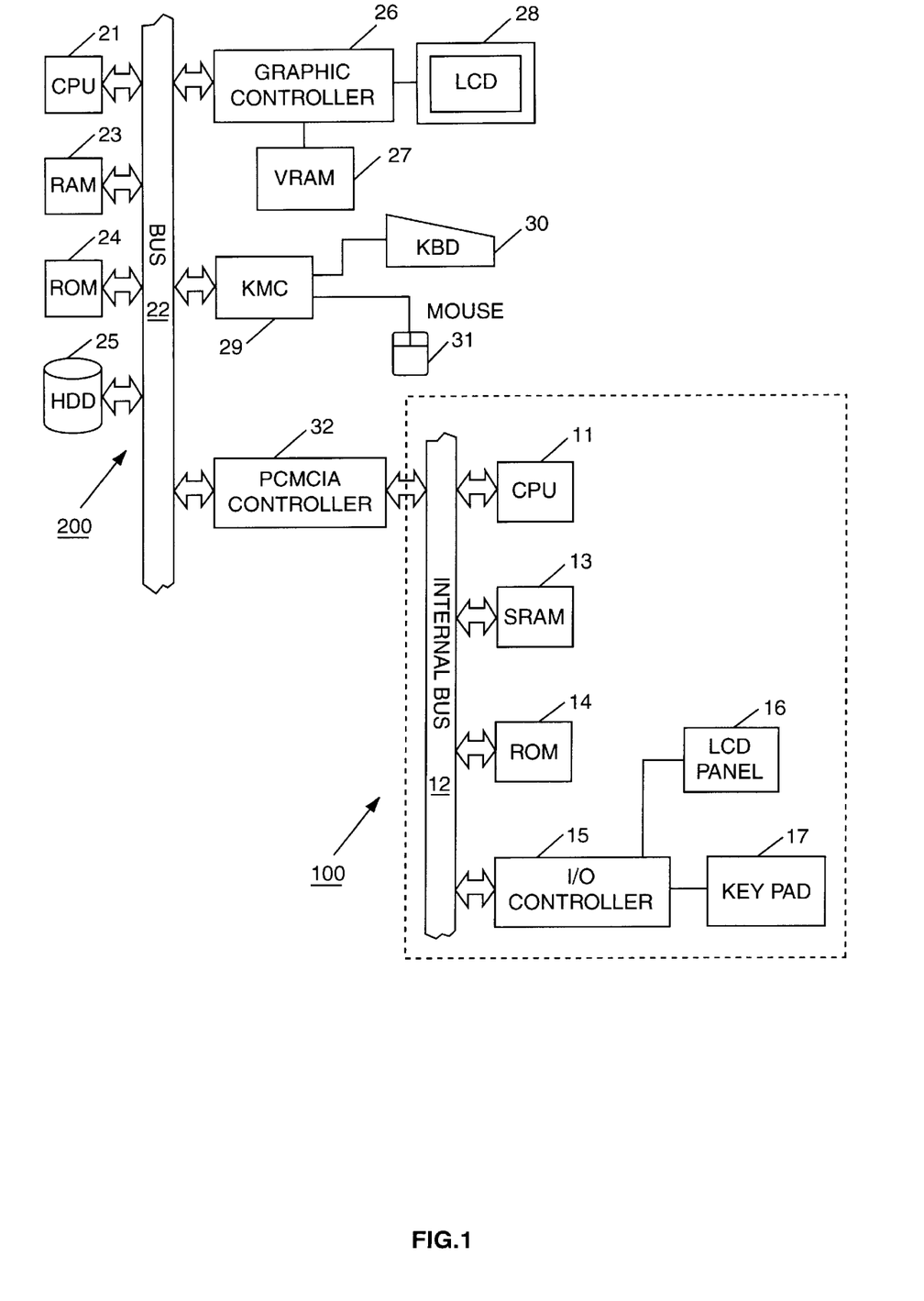
FIG. 1 is a schematic diagram illustrating the hardware arrangement of a system employed according to one embodiment of the present invention.

FIG. 1 is a schematic diagram illustrating the hardware arrangement of an information processing system that embodies the present invention. The information processing system comprises a PC card 100 and a host machine 200 into which the PC card 100 is inserted.

A general purpose personal computer (PC) can serve as the host machine 200. A CPU 21, a main controller, executes various programs under the control of an operating system (OS). A CPU chip, a "Pentium/1xx MHz" sold by Intel Corp., can serve as the CPU 21. The CPU 21 communicates with the individual sections across a bus 22.

The host machine 200 has a RAM 23 and a ROM 24 as memory devices. The RAM 23 is data-writable volatile memory in which programs (e.g., OS and application programs) executed by the CPU 21 are loaded and work data for the CPU 21 is stored. In general, DRAM (dynamic RAM), with which a large memory capacity can be provided at a relatively low cost, is used for the RAM 23. The RAM 23 has the memory capacity of several MB to several tens of MB. A ROM 24 is a nonvolatile memory in which written data are determined during the manufacturing process, and is used to permanently store predetermined code (e.g., BIOS and POST). The host machine 200 has a hard disk drive (HDD) 25 as an external memory device. The HDD 25 has an enormous memory capacity of several hundreds of MB to 1 GB, and is used to store many programs (OS, application programs, etc.) that the CPU 21 executes, and to save a text and a database edited by application programs. A database example is a DIARY file, a To Do file, etc., which will be described later, that are edited by Lotus Organizer.

A graphic controller 26 is a peripheral controller for actually processing a drawing command from the CPU 21. The graphic controller 26 temporarily writes the processed image data into a screen buffer (VRAM) 27, and then reads image data from the VRAM 27 and outputs them to a liquid crystal display (LCD) unit 28 as a display means.

A keyboard/mouse controller 29 is a controller that processes scan data from a keyboard 30 and coordinate values indicated by a mouse 31. The keyboard/mouse controller 29 converts signals input at the keyboard 30 and with the mouse 31 into a format that matches the definition of the OS, and transmits the converted signal to bus 22.

A PCMCIA controller 32 is a controller chip that performs a signal exchange between the host machine 200 and the PC card 100.

The host machine 200, by executing PIM software (e.g., a Lotus Organizer), can edit a database related to personal information, such as a diary and To Do list (which will be described later), and can display such PIM information on a display 28.

The PC card 100 is a Type 2 or a Type 3 card, which conforms to the standard specifications established by the PCMCIA/JEIDA. An internal bus 12 of the PC card 100 is mutually connected to the PCMCIA controller 32 via a PC card slot (not shown) provided for the host machine 200.

The individual sections of the PC card 100 communicate with each other across the internal bus 12.

A CPU 11 is a main controller of the PC card 100. An 8-bit processor "SMC-88112" produced by Seiko Epson Corp. can be used as the CPU 11. When the PC card 100 is in the stand-alone state, the CPU 11 is operated at a clock speed of 32 KHz or 1 MHz. When the PC card 100 is inserted into the host machine 200, the operation of the CPU 11 is suspended.

An SRAM 13 is employed to load a program that the CPU 11 executes (e.g., a "data viewer utility" for referring to personal information when a user carries the PC card 100), and to store work data for the program. When the PC card 100 is inserted into the host machine 200 and the operation of the CPU 11 is thus suspended, the SRAM 13 functions as one part of a memory area for the host machine 200, and data stored in the HDD 25, for example, can be downloaded to it (normally, a data transfer utility program, which will be described later, is used for the downloading operation. It should be noted that, as is well known, the SRAM is a memory device with a static structure that does not require a refresh operation.

In the ROM 14, a nonvolatile memory, are permanently stored codes for driving the individual sections of the PC card 100, a serial number and card attribute information (CIS).

An I/O controller 15 controls the input/output of the PC card 100. More specifically, the I/O controller 15 processes the input at a key pad, which is provided on the surface of the case of the PC card 100, and the display for an LCD panel, which is also provided on that surface.

While the PC card 100 is being inserted into the slot of the host machine 200, the CPU 11 enters the suspend state and the PC card 100 functions as an ordinary SRAM card. Accordingly, data, such as personal information, stored in the HDD 25 can be downloaded to the PC card 100. When the PC card 100 is removed from the host machine 200 and begins stand-alone operation, the CPU 11 becomes active and the PC card 100 functions as a portable PC. At this time, the downloaded personal information can be accessed by the CPU 11 and then referred to on the LCD panel 16.

Besides the components shown in FIG. 1, an interface circuit and many other hardware components, such as a system clock for measuring a real time, are necessary to constitute the PC card 100 and the host machine 200. Since these components are well known to one having ordinary skill in the art, and are not related to the subject of the present invention, no explanation for them will be given in this specification.

According to a specific aspect, the operation of the present invention is an operation wherein only a record that adequately satisfies a predetermined extraction condition is selected from among transmission data edited by the host machine 200, and is downloaded to the PC card 100. In this embodiment, a case is specified wherein personal information edited by PIM software, such as Lotus Organizer, particularly data that includes date information, such as for a diary or a To Do list, is to be transferred to the PC card 100. Thus, in this sub-division will be explained matters that can be the premise of the embodiment: a function of the Lotus Organizer and characteristic of edited personal information.

Lotus Organizer is one of the PIM software programs for managing personal information, and has various functions, such as a scheduler, an address book and a note pad.

Figure 2:
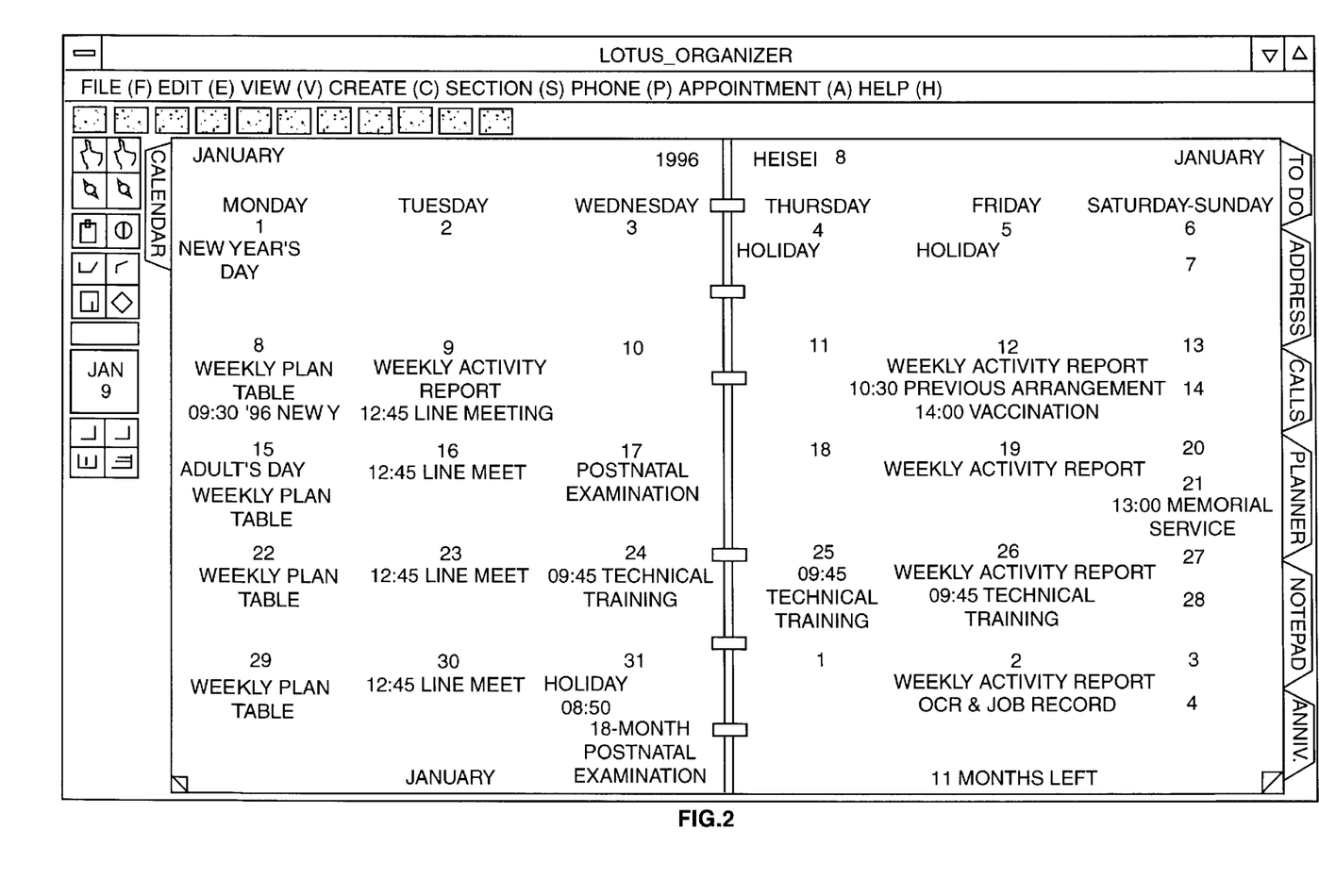
FIG. 2 is a diagram showing a calendar screen generated by Lotus Organizer release 2, or more specifically, showing a calendar screen for January of 1996.
Figure 8:
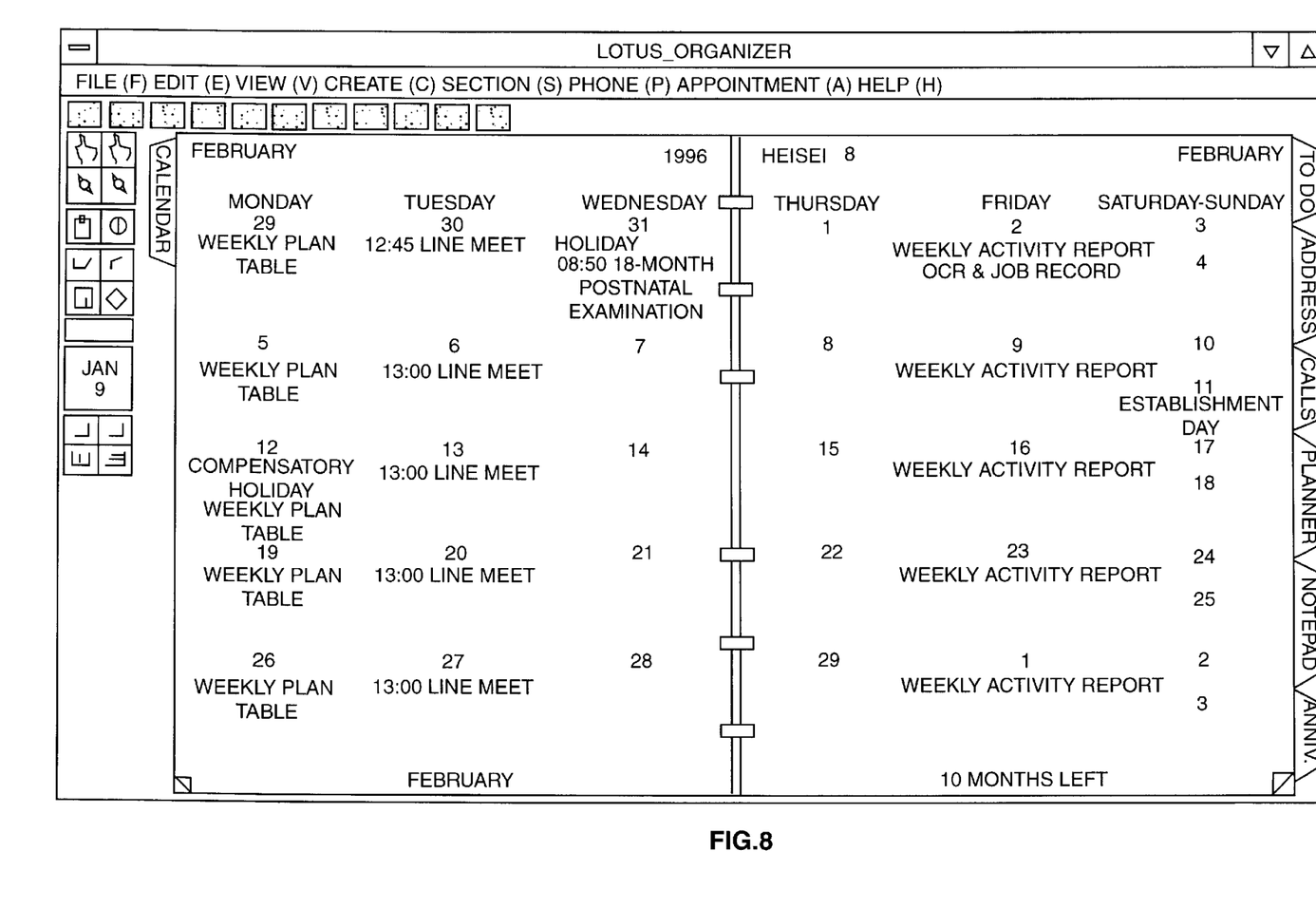
FIG. 8 is a diagram showing a calendar screen generated by Lotus Organizer release 2, or more specifically, showing a calendar screen of February of 1996.
Figure 9:
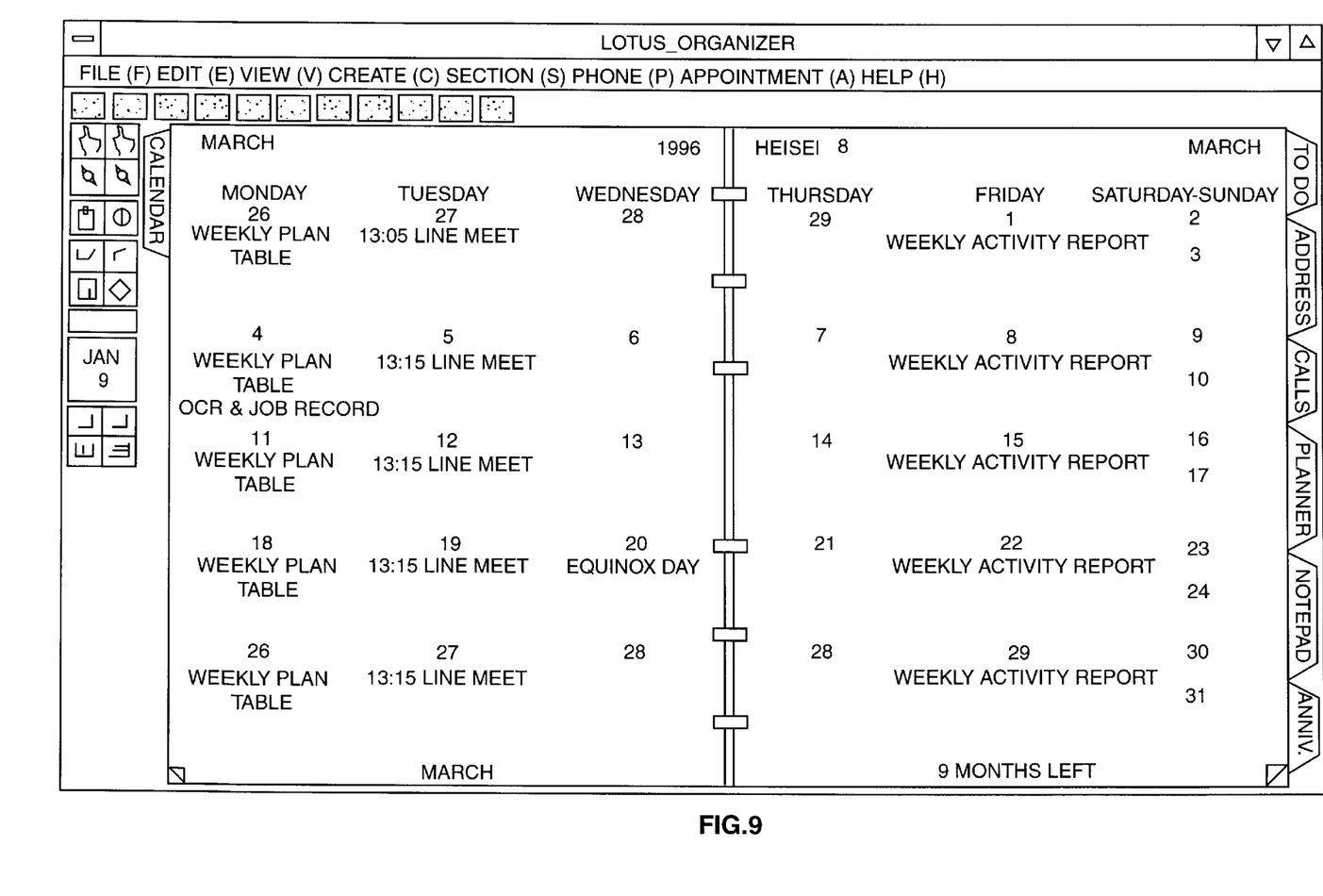
FIG. 9 is a diagram showing a calendar screen generated by Lotus Organizer release 2, or more specifically, showing a calendar screen of March of 1996.

In the environment provided by a GUI (Graphical User Interface), various application programs, to include Lotus Organizer, are registered and displayed as icons in a window on the screen of the display 28. Lotus Organizer, for example, is activated by pointing at a Lotus Organizer icon with a mouse and double clicking. In FIGS. 2, 8 and 9 a calendar screen is shown produced by Lotus Organizer R2J. The screen imitates the appearance of a notebook added in a binder. A schedule can be displayed by the day, the week, the month or the year, and data input can be performed (in the examples shown in the diagrams the display is by the month). Events and jobs are displayed in the columns in dates in the calendar (e.g., "vaccination" at 14:00 for the January 12th column).

The calendar of Lotus Organizer reads a record that corresponds to a specific date from a personal information database, which is jointly used with another PIM software application, and displays it in a column of the calendar screen that corresponds to the date. The personal information database is usually stored on the HDD 25. A "diary" for managing dates and times at which events will be held, and a "To Do" list for managing the progress and the due date of each job are examples of personal information databases including date information. Data for the diary or the To Do list can be input at the calendar screen.

Lotus Organizer can maintain, ordinarily as binary format files, personal information databases that are input and that it edits itself. For example, data for 1996 related to the diary are stored in a binary file named "96DIAR.ORG", and data for the same year related to a To Do list are stored in a binary file named "96TODO.ORG". It should be noted that, as is well known, the binary file can not be read through standard procedures. Therefore, taking data exchange with another PIM software application into consideration, Lotus Organizer has a function for converting binary the format into a CSV format (Comma Separated Value Format: a format in which fields in a record are separated with commas). CSV files that correspond to binary files "96DIAR.ORG" and "96TODO.ORG" have their file extensions changed to "96DIAR.CSV" and "96TODO.CSV", for example, and are saved.

In Tables 1 and 2 (FIGS. 10 and 11) are shown the results obtained by re-editing, using table calculation software (e.g., "Microsoft_Excel"), the contents of the diary file and the To Do file (i.e., "96DIAR.CSV" and "96TODO.CSV"), that are displayed on the calendar in FIGS. 2, 8 and 9.

Figure 10:
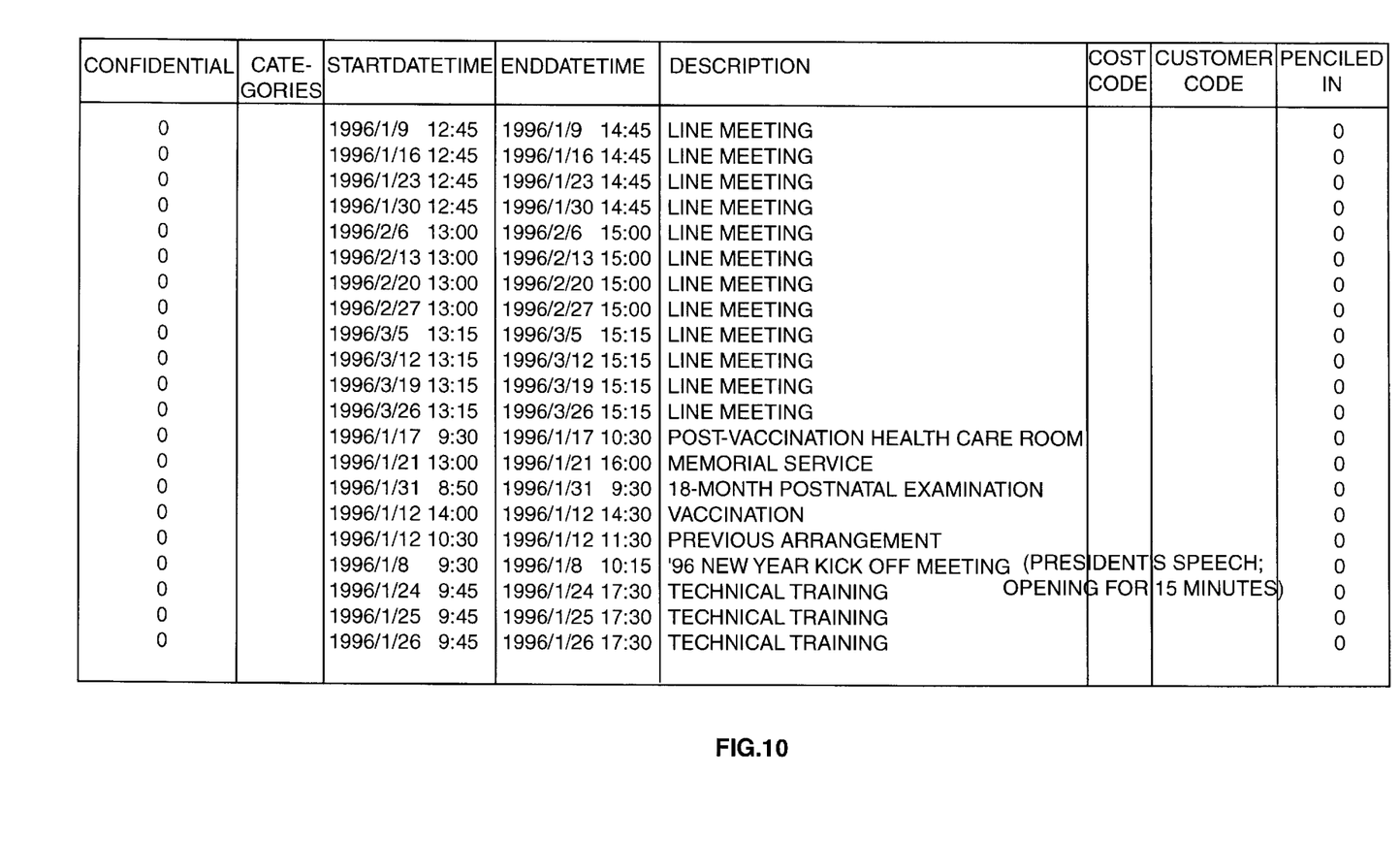
FIG. 10 is a Table, referred to hereinafter as Table 1, illustrating the result of re-editing certain data files.

In Table 1 are shown the contents of "96DIAR.CSV", with each row corresponding to one record. In the database for the diary, one record is prepared for each event. Each record includes a "Description" field in which the content of an event is written, and a "StartDateTime" field and an "EndDateTime" field in which dates and times for the beginning and the end of an event are respectively written. The fields in the "96DIAR.CSV" file are separated by commas.

In Table 2 are shown the contents of "96TODO.CSV", with each row corresponding to one record. In the database for the To Do list, one record is prepared for each job. Each record includes a "Description" field, in which the content of a job is written; a "StartDate" field, in which the corresponding date to which the corresponding job is assigned is written; a "DueDate" field, in which the date on which the corresponding job is to be completed is written; a "Priority" field, in which the priority order of jobs is written; a "CompletionDate" field, in which the date on which the corresponding job is actually completed is written; and a "Status" field, in which the current progress of the corresponding job is written. These fields in the "96TODO.CSV" file are separated by commas.

It should be noted that the contents of a specific field can easily be retrieved from the record in a CSV format file as will now be described.

The present invention is realized by, for example, a data transfer utility program for transmitting edited data to a CSV format by PIM software from the host machine 200 to the PC card 100. Personal information (e.g., "96DIAR.CSV" and "96TODO.CSV") created by editing in the host machine 200, which is not limited as to the memory capacity, is relatively huge. On the other hand, the memory space on the PC card 100 is only one hundred or several tens of KB (e.g., 128 KB), which are provided by the SRAM 13. In accordance with a predetermined extraction condition, such as date information, the data transfer utility program according to the present invention transfers only a required partial record in the database to the PC card 100. The data transmission operation will now be described in detail while referring to FIGS. 3 through 6.

Figure 3:
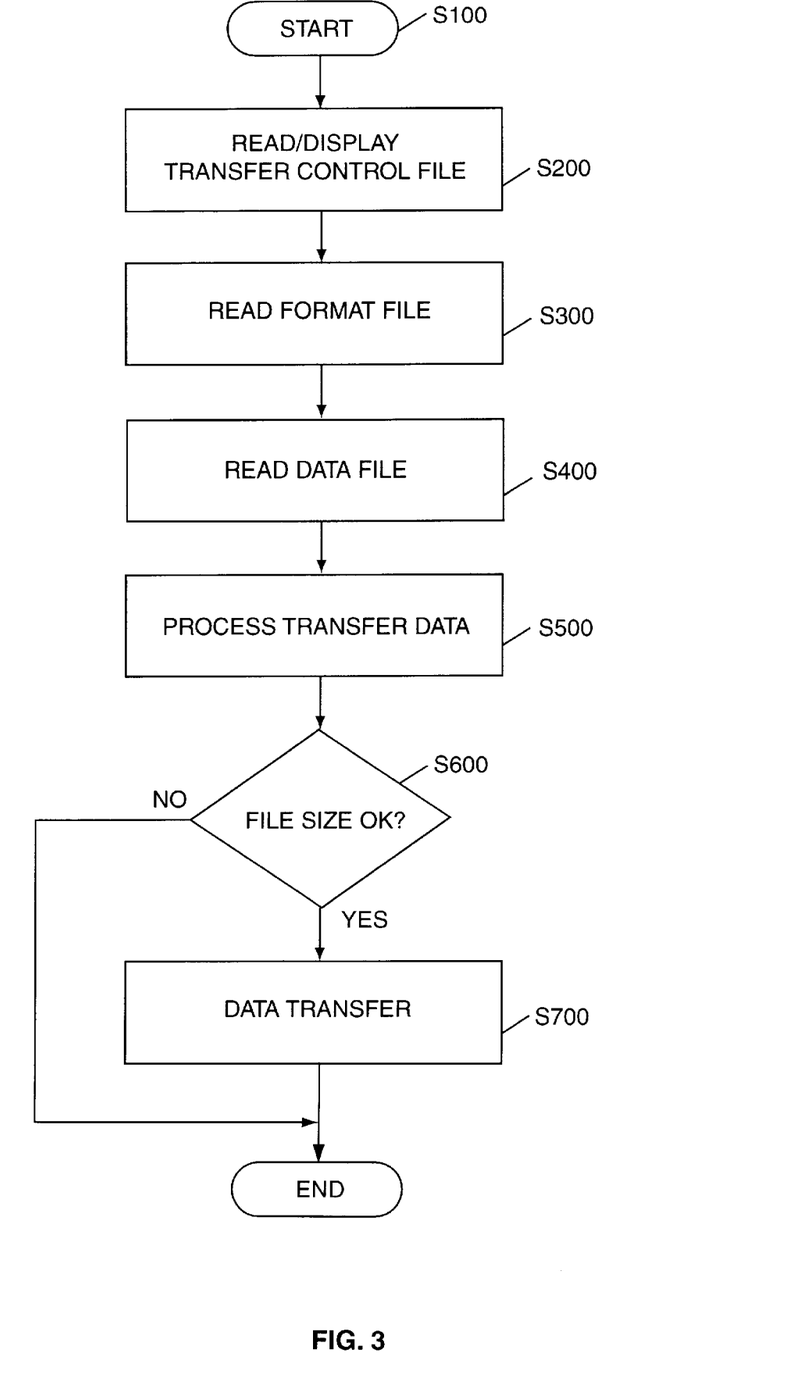
FIG. 3 is a flowchart showing a global routine of a data transfer utility program.

FIG. 3 is a flowchart of the global routine for the data transfer utility program.

In the GUI environment, the data transfer utility program is registered and is displayed as an icon on the desktop screen of the display 28 (not shown). When, for example, the utility icon is selected, by double clicking on the icon, the data transfer utility program is activated and a series of processes is begun (step S100).

Figure 4:
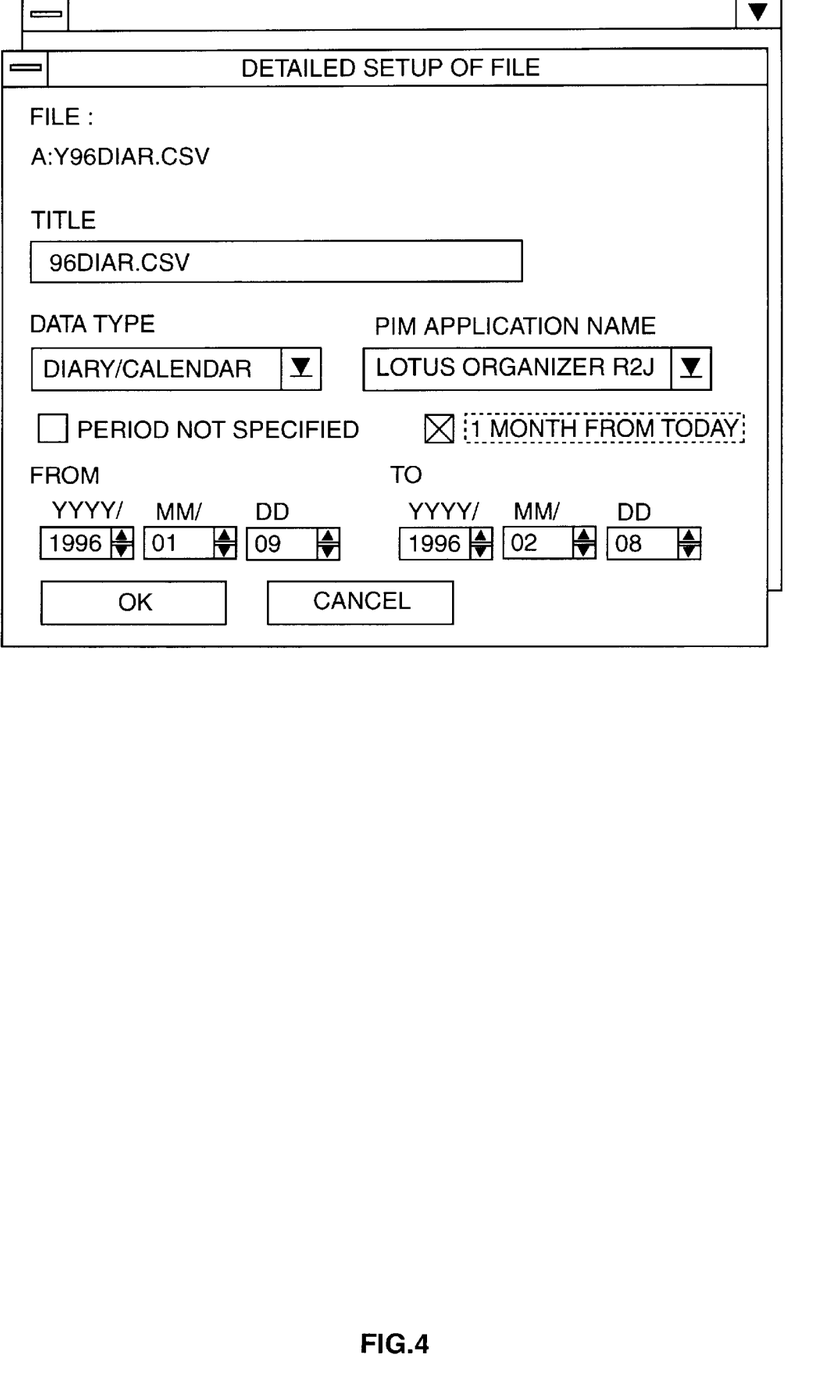
FIG. 4 is a diagram illustrating the contents of the transfer control file displayed on a screen.

The activated utility program reads a transfer control file (step S200). The transfer control file is a file in which are the format types and the extraction conditions for the databases concerned with the diary and the To Do list, and storage file names. The extraction condition is the period (i.e., the beginning date and the end date) covered by the data to be transferred to the PC card 100. The extraction condition at the automatic setting (default) is a one-month period beginning on the current date for data transfer (for example, when the current date is Jan. 8, 1996, the period for extraction extends from that day until February 7th). In Table 3 below are shown the contents of the transfer control file. When the extraction condition (i.e., the beginning date and the end date) is automatically set, asterisks ("**") are entered to fill pertinent fields. As is shown in FIG. 4, the data transfer utility program may display the contents of the transfer control file on a screen so that the data can be changed at any time.

TABLE 3

| Data type | Title | Format type | From YYYYMMDD | From YYYYMMDD | File name |
| --- | --- | --- | --- | --- | --- |
| DIARY | 96DIAR.CSV | OR2 | ******** | ******** | A:¥96DIAR.CSV |
| ToDo | 96ToDo.CSV | OR2 | ******** | ******** | A:¥96DIAR.CSV |

As is apparent from the transfer control file in Table 3, 1) a database that concerns a diary, of OR2 format type (i.e., organizer R2J), with the file name "96DIAR.CSV" is stored on drive A;

2) a database that concerns the To Do list, of format type OR2, with the file name of "96TODO.CSV" is stored on drive A; and 3) the extraction condition for these database is automatically set.

Then, at step S300, the format file is read to acquire information that concerns the format type indicated in the transfer control file. The information that concerns the format type indicates the order, in a record for each format type, of the fields in which is the information required for transfer control: "StartDateTime", "DueDate", and "Description" fields. Since in the CSV format file the fields in a record are separated by commas, it is easy to extract a field from those arranged in the specified order.

At step S400, the original data file to be transferred, such as "96DIAR.CSV" or "96TODO.CSV", is read, and is temporarily written in the work area for the utility program.

Following this, at step S500, from the full file of "96DIAR.CSV" or "96TODO.CSV", only a record that adequately satisfies a predetermined extraction condition is selected and is written in a temporary file. The predetermined extraction condition is, for example, a one month period that begins on the current date, the date on which data are transferred, as provided or the automatic setting (previously described). A one month period beginning on a current date is merely a default value that is determined in accordance with empirical rules, such that:

1) the volume of data required for a one-month diary or for a To Do list is appropriate for downloading to the PC card 100 (i.e., the size of transferred data can be reduced); and 2) one month is an appropriate reference period when the PC card 100 is carried and employed as a system notebook.

The process at step S500 is a core process routine of the present invention, and will be described later in detail.

At step S600, a check is performed to determine whether or not the size of the temporary file that was created at step S500 falls in the permissible capacity for the SRAM 13 of the PC card 100 (i.e., it is 128 KB or smaller). When the result of the determination is negative, program control skips step S700 and the process is thereafter terminated without transferring the temporary file. This is because, if data transfer is forcibly performed, undesirable event may occur, such as one where data that exceed the permissible capacity overwrite another memory area in the SRAM 13.

When the result of the determination at step S600 is affirmative, program control advances to step S700, whereat the temporary file is transferred to the PC card 100, and the processing series is thereafter terminated. The temporary file downloaded to the PC card 100 can be displayed on the LCD panel 16 by the data viewer utility program, and can also be edited by using the key pad 17 (so long as the PC card 100 is used as a stand-alone unit).

Figure 5:
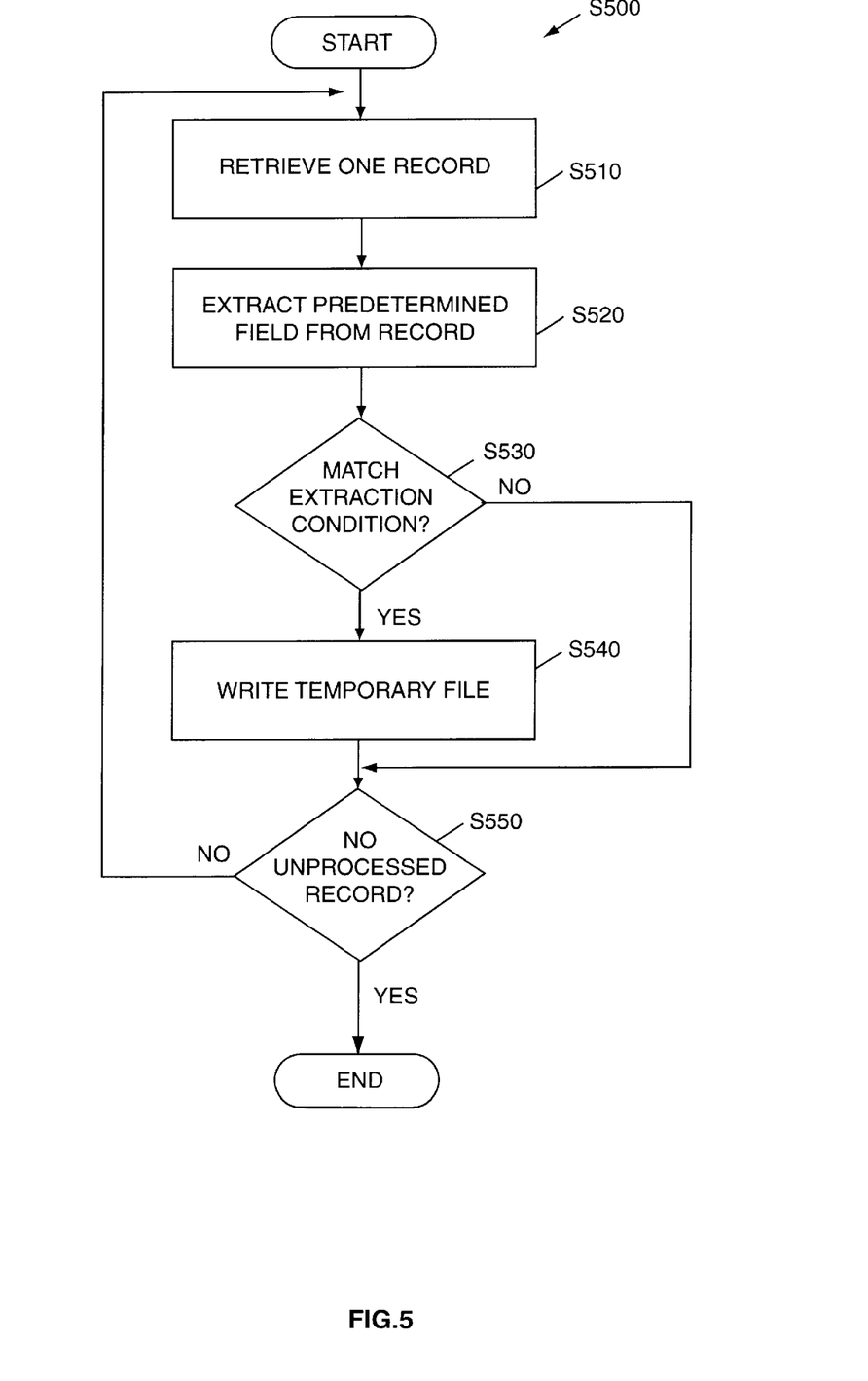
FIG. 5 is a detailed flowchart for a process at step S500.

The process at step S500 in FIG. 3 will now be described in detail. FIG. 5 is a detailed flowchart of the process at step S500. The process in FIG. 5 will be explained.

First, at sub-step S510, only one record is retrieved from a data file to be transferred (e.g., "96DIAR.CSV" or "96TODO.CSV").

At sub-step S520, the contents of a predetermined field are extracted from the record that was retrieved. The predetermined field here means a field that stores data necessary to determine whether or not the record satisfies the extraction condition. In this embodiment, the extraction condition is the date information for a calendar. If a data file is "96DIAR.CSV", a "StartDateTime" field is extracted in which stored is date information for specifying the date column of the calendar. If a data file is "96TODO.CSV", a "DueDate" field is extracted in which is stored date information for specifying the date column of the calendar. Since in a CSV format file the fields of the records are separated by commas, it is easy to extract the field from those arranged in the specified order.

At sub-step S530, a check is performed to determine whether or not extracted data at step S520 satisfies a predetermined extraction condition. In this embodiment, the extraction condition is related to date information for the calendar, and is "a one month period beginning on a current date when data are to be transferred", as provided by the automatic setting. Therefore, the "StartDateTime" field in each record is extracted for the "96DIAR.CSV" file, while the "DueDate" field is extracted for the "96TODO.CSV" file.

When the result of the determination at sub-step S530 is affirmative, i.e., when the record concerns plans for a period extending up to one month in the future, at sub-step S540 the record is written into a temporary file. The temporary file here is a file that is used to temporarily accumulate data to be downloaded to the PC card 100.

If the result of the determination at sub-step S530 is negative, i.e., when the record concerns plans other than those for one month in the future, step S540 is skipped and the record is not written into the temporary file and is abandoned. As a result, at step 700 (see FIG. 3) such record is not transferred to the PC card 100.

Following this, at sub-step S550, a check is performed to determine whether or not a record is present in a data file (e.g., "96DIAR.CSV" or "96TODO.CSV"). If there is no unprocessed record, program control branches to Yes, and the process at step 500 is terminated. When a unprocessed record is present in the data file, program control returns to sub-step S510, the next record is read, and the above described process is repeated.

In Tables 4 and 5 below are listed the contents extracted from data files "96DIAR.CSV" and "96TODO.CSV" in Tables 1 and 2 by the data transfer utility program (it should be noted that the current date is Jan. 8, 1996 and the extraction condition is the default). Only these contents are to be downloaded to the PC card 100.

TABLE 4

| Date | Time | Contents |
| --- | --- | --- |
| 96/01/08 | 09:30 | '96 New Year Kick Off Meeting (President speech: 15 min at opening) |
| 96/01/09 | 12:45 | Line Meeting |
| 96/01/12 | 10:30 | Previous Arrangement |
| 96/01/12 | 14:00 | Vaccination |
| 96/01/16 | 12:45 | Line Meeting |
| 96/01/17 | 09:30 | Post-vaccination Check; Health Care Room |
| 96/01/21 | 13:00 | Memorial Service |
| 96/01/23 | 12:45 | Line Meeting |
| 96/01/24 | 09:45 | Technical Training |
| 96/01/25 | 09:45 | Technical Training |
| 96/01/26 | 09:45 | Technical Training |
| 96/01/30 | 12:45 | Line Meeting |
| 96/01/31 | 08:50 | 18-month Postnatal Examination |
| 96/02/06 | 13:00 | Line Meeting |

TABLE 5

| Date | Priority | Contents |
| --- | --- | --- |
| 96/01/12 | 1 | Weekly Activity Report |
| 96/01/15 | 3 | Weekly Schedule |
| 96/01/19 | 1 | Weekly Activity Report |
| 96/01/22 | 3 | Weekly Schedule |
| 96/01/26 | 1 | Weekly Activity Report |
| 96/01/29 | 3 | Weekly Schedule |
| 96/02/02 | 1 | Weekly Activity Report |
| 96/02/02 | nil | OCR & Job Recording List |
| 96/02/05 | 3 | Weekly Schedule |

Figure 6:
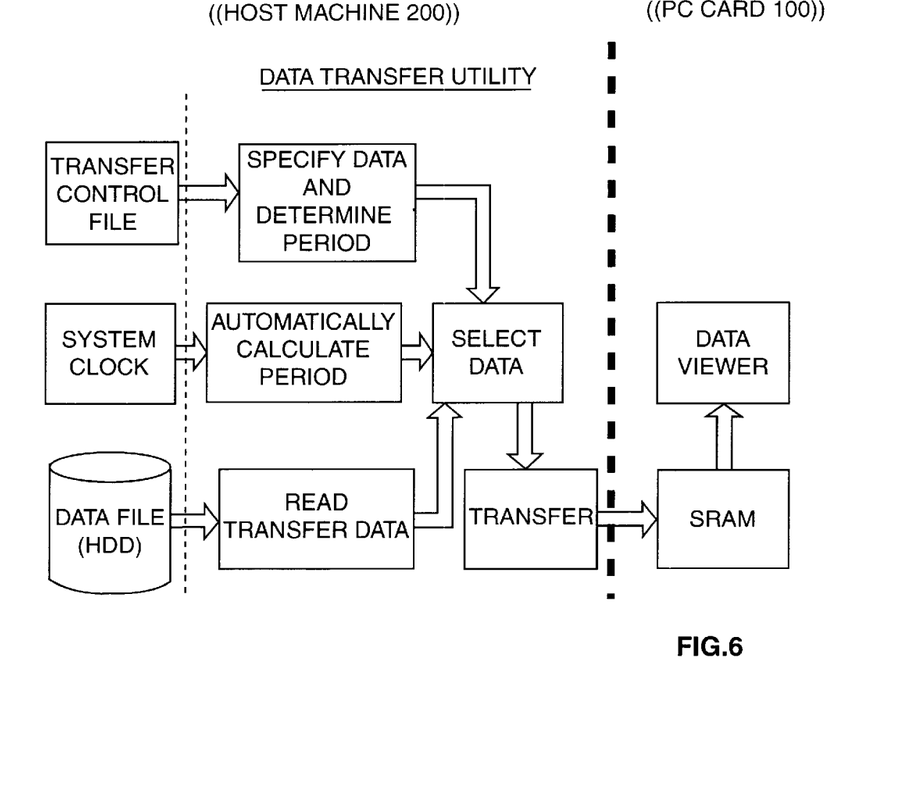
FIG. 6 is a functional block diagram illustrating the data transfer utility program while observing data flow.

FIG. 6 is a functional block diagram illustrating the data transfer utility program while observing the data flow. The functions will now be described.

When the data transfer utility program is activated, a transfer control file is read to acquire the format type of and the extraction condition for a transferred file (step S200 in FIG. 3). The current date is acquired by using a system clock, and a period for a record to be transferred is automatically set (e.g., if the current date is Jan. 8, 1996, a period extending from January 8th to February 7th is set).

The HDD 25 is also accessed and an actual data file (e.g., "96DIAR.CSV" or "96TODO.CSV") is read. The format of the CSV file may be changed for processing convenience.

The data transfer utility extracts from among the records in the actual data file only a record for the automatically set period, and writes it into the temporary file (step S500 in FIG. 3).

Then, the data transfer utility transfers the temporary file to the PC card 100 (step S700 in FIG. 3). At this time, a check may be performed to determine whether or not the size of the temporary file falls within the permissible capacity (i.e., 128 KB or smaller) for the PC card 100 (step S600 in FIG. 3).

Later, when the PC card 100 is removed from the host machine 200 and is to operate as a stand-alone unit, the incorporated CPU 11 is activated and can execute various programs. An example program is a "data viewer" that serves as a system notebook. The data viewer provides a function that displays, on the LCD panel 16, personal information acquired from the host machine 200, and edits the personal information.

The "gap between memory capacities", which was described in "Objectives", can be resolved by a user manually processing files each time a specific database (e.g., a personal information file) is to be downloaded. However, such manual processing is a troublesome task for a user. It should be fully understood that the data transfer utility program that embodies the present invention has as one object the reduction of the operational procedures required for the extraction of required data.

In the drawings and specifications there has been set forth a preferred embodiment of the invention and, although specific terms are used, the description thus given uses terminology in a generic and descriptive sense only and not for purposes of limitation.

What is claimed is:

1. A method for transmitting data from a first processing unit having a first memory device with a relatively large memory capacity to a second processing unit have a second memory device with a relatively small memory capacity, comprising the steps of:

(a) retrieving data stored in said first memory device, each record in said data including date information;

(b) extracting a predetermined date information field from each record one by one among said retrieved data;

(c) determining whether the extracted data satisfies a predetermined time period;

(d) storing in a temporary file only a record, from said retrieved data, relating to a predetermined time period including a current date only if the extracted data satisfied the predetermined time period;

(e) determining whether or not the size of said temporary file is within the capacity of said second memory device; and (f) transferring said temporary file to said second processing unit in response to an affirmative result of the step (e), or not transferring said temporary file to said second processing unit in response to a negative result of the step (e).

2. The method of claim 1, further including the following step after step (d):

determining whether or not an unprocessed record is present in a data file and performing step (e) only in response to a determination that there is no unprocessed record in said data file.

* * * * *